(12) United States Patent
Herman et al.

(10) Patent No.: US 8,038,076 B2
(45) Date of Patent: Oct. 18, 2011

(54) SYSTEM AND METHOD FOR DYNAMIC SOLENOID RESPONSE ADJUST CONTROL

(75) Inventors: Andrew D. Herman, Grand Blanc, MI (US); Michael A. Kozan, Canton, MI (US); KyoungPil Hwang, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 938 days.

(21) Appl. No.: 12/017,665

(22) Filed: Jan. 22, 2008

(65) Prior Publication Data

US 2009/0183777 A1 Jul. 23, 2009

(51) Int. Cl.
G05D 23/02 (2006.01)
G05D 23/12 (2006.01)
(52) U.S. Cl. .............. 236/93 R; 137/2; 137/12; 137/468
(58) Field of Classification Search ................ 236/93 R; 137/2, 12, 468
See application file for complete search history.

(56) References Cited

U.S. PATENT DOCUMENTS

| | | | | |
|---|---|---|---|---|
| 5,222,417 A | * | 6/1993 | Sato | ................................ 474/28 |
| 6,588,394 B2 | | 7/2003 | Zheng | |
| 2011/0010067 A1 | * | 1/2011 | Rubenbauer et al. | ........... 701/70 |

OTHER PUBLICATIONS

SAE Technical Paper Series, 2007-01-0502, "A Hardware-in-the-Loop Test Bench for Production Transmission Controls Software Quality Validation," Quan Zheng, Woowon Chung, Ken Defore and Andrew Herman, Delphi Corporation, Reprinted from: In-Vehicle Software & Hardware Systems, 2007 (SP-2126), 2007 World Congress, Detroit, Michigan, Apr. 16-19, 2007.

* cited by examiner

*Primary Examiner* — Marc Norman
(74) *Attorney, Agent, or Firm* — Thomas N. Twomey (57) ABSTRACT

A method is described for controlling a solenoid-operated fluid valve having an output hydraulic pressure that varies in accordance with an input solenoid control current delivered from a drive circuit. A model is provided characterizing the plant dynamics of the solenoid-operated fluid valve and the drive circuit where the model is dependent on at least one operating parameter. The method, during operation, involves measuring the value of the operating parameter and adjusting based on the measured operating parameter value one or more gain constants to be used in a selected control strategy. The model is used in adjusting the gains. Finally, the method involves determining a required solenoid control current according to the control strategy with the now dynamically-adjusted gain constants. The control strategy may be a PI control strategy. The model-based system allows easy migration of the general control strategy to different hardware configurations by developing target system specific data for the model.

7 Claims, 6 Drawing Sheets

SYSTEM AND METHOD FOR DYNAMIC SOLENOID RESPONSE ADJUST CONTROL

TECHNICAL FIELD

The present invention relates generally to a control system and more particularly to a dynamic solenoid response adjust control system.

BACKGROUND OF THE INVENTION

Hydraulic fluid controls can be found in a variety of automotive applications such as automatic speed change transmissions as well as others. In these applications, it is often desirable to control the pressure of the hydraulic fluid.

In the specific context of an automatic speed change power transmission, it is known to use electronic transmission control units that are configured to generate electrical signals that control solenoids resulting in the control of fluid flow as well as the pressure in a hydraulic fluid line. As known, the pressure in a hydraulic fluid line can be used to control various other elements in an automatic transmission system including for example a hydraulically-actuated clutch for the engagement of individual gears. By engaging various combinations of gears (e.g., planetary gears in a planetary gear transmission), an automatic transmission system accomplishes the same task as the shifting of gears in a manual transmission. Hydraulically-actuated clutches that are found in transmissions are typically used for engaging a pair of gears (e.g., a pair of rotating members, or alternatively, one rotating member and one non-rotating member) together such that when the clutch is applied, torque can be transmitted from one shaft to the other. Shift changes may also include switching three or more clutches on occasion for certain types of shifts, and herein references to two clutch type shifts could also include the multiple shifts.

An important operating aspect of a hydraulically operated clutch relates to the pressure build-up of the applied hydraulic fluid. In general, fluid flow at a certain applied pressure is sought to be controlled and varied to apply the clutch in order to obtain a desired engagement characteristic, principally with respect to timing and smoothness. It should be appreciated that if the timing of the engagement of one gear with the disengagement of another gear is not coordinately properly, overall shift performance may suffer. It is thus desirable and known in the art to control the clutch pressure. It is known to provide a linear solenoid to control the hydraulic fluid pressure to apply and/or release the clutch. In a linear solenoid, the amount of fluid at a controlled pressure can be varied by changing a solenoid control current.

Such electro-hydraulic (EH) systems are complex, and even generally similar EH systems (e.g., alternate automatic transmission hardware platforms) have a response that is different from system-to-system, and which is dependent on the particular EH plant characteristics. For example, each EH system may have a different and unique electrical drive circuit for producing a required solenoid control current. Moreover, each may have a different and unique linear solenoid that is being driven. An overall controller may be provided for use across a variety of such similar platforms, and conventionally may employ a proportional-integral (PI) control strategy for controlling the step response of the system. It is known to provide such a generic PI controller using gain constants that are selected to give a good overall response, but under some circumstances may result in instability and/or a slow response. Inherent in the conventional approach is a compromise regarding the overall range of operating conditions expected to be encountered as well as variation in the actuator dynamics across various platforms.

U.S. Pat. No. 6,588,394 entitled "MODEL-BASED CONTROL OF A SOLENOID-OPERATED HYDRAULIC ACTUATOR FOR ENGINE CYLINDER DEACTIVATION" issued to Zheng ("Zheng"), owned by the common assignee of the present invention and incorporated herein by reference in its entirety, discloses a model that characterizes a solenoid valve, which is used in an open loop context to calculate a solenoid plunger response time, which in turn is used in an overall timing calculation. The Zheng reference, however, does not teach the use of the solenoid valve model for dynamically adjusting control gains used to control the solenoid.

There is therefore a need for a system and method for providing a dynamic solenoid response adjust control that minimizes or eliminates one or more of the problems described above.

SUMMARY OF THE INVENTION

The present invention is directed to a method of controlling a solenoid-operated fluid valve. One advantage of the present invention is that allows dynamic adjustments to various control gain-constants as environmental influences, such as oil temperature and battery voltage, change. This dynamic adjustment can provide very good transient response. Second, the invention provides a mechanism for defining and using a model of the plant characteristics of the solenoid (and drive circuit). This provides the flexibility needed to easily adapt a general higher level control strategy to different hardware configurations by simply populating the model with new data derived for the target hardware configuration.

A method is provided for controlling a solenoid-operated fluid valve having an output hydraulic pressure that varies in accordance with an input solenoid control current delivered from a drive circuit. The method includes a model characterizing the plant dynamics of the solenoid-operated fluid valve and the drive circuit. The model is dependent on at least one operating parameter (e.g., oil temperature, battery voltage), which may vary in value during operation. The method involves the step of measuring the value of the operating parameter. Next, adjusting one or more gain constants for a selected control strategy, based on the measured operating parameter value and the model. In one embodiment, the control strategy may be a PI control strategy. Finally, the method involves determining a required solenoid control current based on the selected control strategy, which now includes newly calculated gain constants dynamically-adjusted based on changing conditions in view of the plant dynamics of the drive circuit and solenoid.

Other features, aspects and advantages of the present invention are also presented.

BRIEF DESCRIPTION OF THE DRAWINGS

The present invention will now be described, by way of example, with reference to the accompanying drawings.

DETAILED DESCRIPTION OF THE PREFERRED EMBODIMENT

Figure 1:
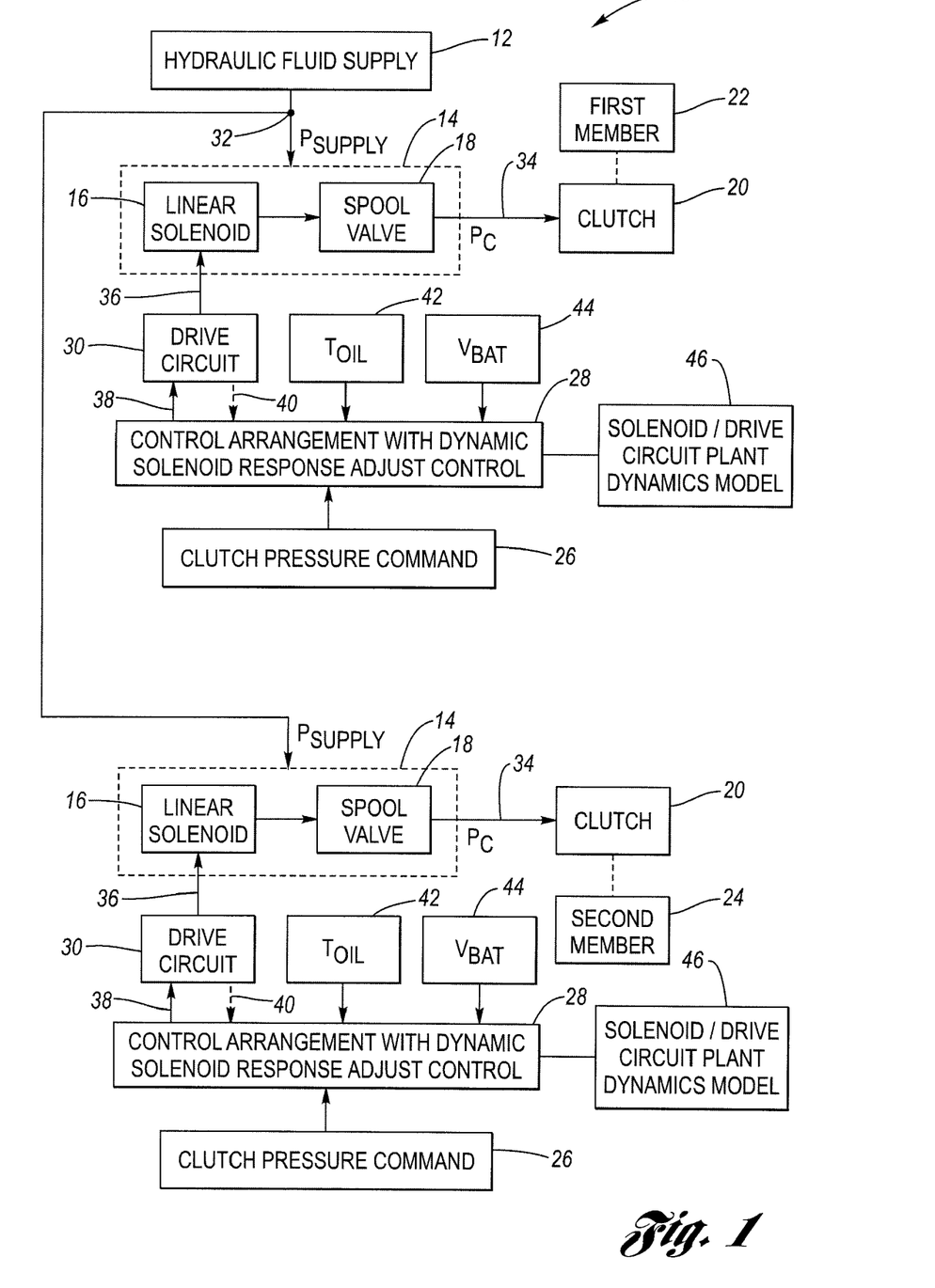
FIG. 1 is a block diagram showing a system of the present invention.

Referring now to the drawings wherein like reference numerals are used to identify identical components in the various views, FIG. 1 is a simplified block diagram of an apparatus 10 for controlling a solenoid-operated fluid valve. A selected control strategy (e.g., PI, PID or the like) is contemplated for use in controlling the electrical solenoid current being produced by a drive circuit to drive the solenoid-operated fluid valve. Such a control strategy has certain gain constants associated with the various terms (e.g., a proportional gain term—$K_p$, an integral gain term—$K_i$, etc.). As described in the Background, conventional approaches are developed to provide good overall response, but in certain conditions can cause instability and/or a slow response. The invention is directed to an approach for dynamically adjusting the gain constants based on the prevailing operating conditions, such as the hydraulic fluid temperature, in view of the plant dynamics of the drive circuit/solenoid, to provide an improvement in the dynamic response. This improvement is achieved not only over a wide, anticipated operating range, but has the capability of being easily altered for use with a wide variety of different drive circuit/solenoid hardware configurations as well. It should be understood that apparatus 10 may be configured to control other parameters, such as the desired clutch pressure, in addition to this invention which is directed to controlling the solenoid current.

While a more detailed description of the various components shown in FIG. 1 will be set forth below, for purposes of the present invention, the most immediately applicable aspects of the apparatus 10 will be described first. FIG. 1 shows a hydraulic fluid supply 12, an electro-hydraulic (EH) pressure control module 14 including a linear solenoid 16 and a pressure regulating valve 18, a hydraulically-actuated clutch 20, a pair of members 22, 24 in a vehicle transmission, a clutch pressure command signal 26 (from an application control program/layer), a control arrangement 28 with the inventive dynamic solenoid response adjust logic, and a drive circuit 30. Generally, a hydraulic fluid supply is provided on line 32 at a regulated supply pressure ($P_{SUPPLY}$). The module 14 provides an output pressure on line 34, which is coupled to clutch 20. The pressure developed at clutch 20 is designated $P_C$.

The drive circuit 30 is configured to produce a solenoid control current 36 in response to a solenoid current command 38. Where solenoid 16 is a current controlled device, the drive circuit 30 may comprise a current controller, for example. The drive circuit 30 may include a means for determining the actual solenoid current and producing a solenoid current level signal 40 indicative of the actual current level (e.g., a conventional drive circuit may include a sense resistor for such a purpose). The solenoid current signal 40, or alternatively an estimated solenoid current signal 40 may be used by the control arrangement 28 for feedback purposes, particularly for use in a selected control strategy where dynamically-calculated gain constants are produced according to the invention.

Control arrangement 28 may be further responsive to at least one operating parameter, such a hydraulic fluid temperature parameter 42, designated $T_{OIL}$, and a battery voltage parameter 44, designated $V_{BAT}$. The oil temperature $T_{OIL}$ may be used as or proxy for the solenoid coil temperature. The coil temperature is important to know as the coil resistance will change with temperature (and hence the electrical characteristics). Also, it is important to know the battery voltage level, as this is the voltage source typically used by the drive circuit in producing the solenoid control current (and hence also affects the electrical characteristics). Additionally, control arrangement 28 may be configured to make use of a model 46 that describes the electrical plant dynamics of the solenoid 16 and the drive circuit 30. By using the plant model 46, the control arrangement 28 can be configured to adjust, in real time, the various control gain constants in response to changing environmental conditions (e.g., temperature, voltage) with always-assured stability and improved dynamic response.

Figure 2:
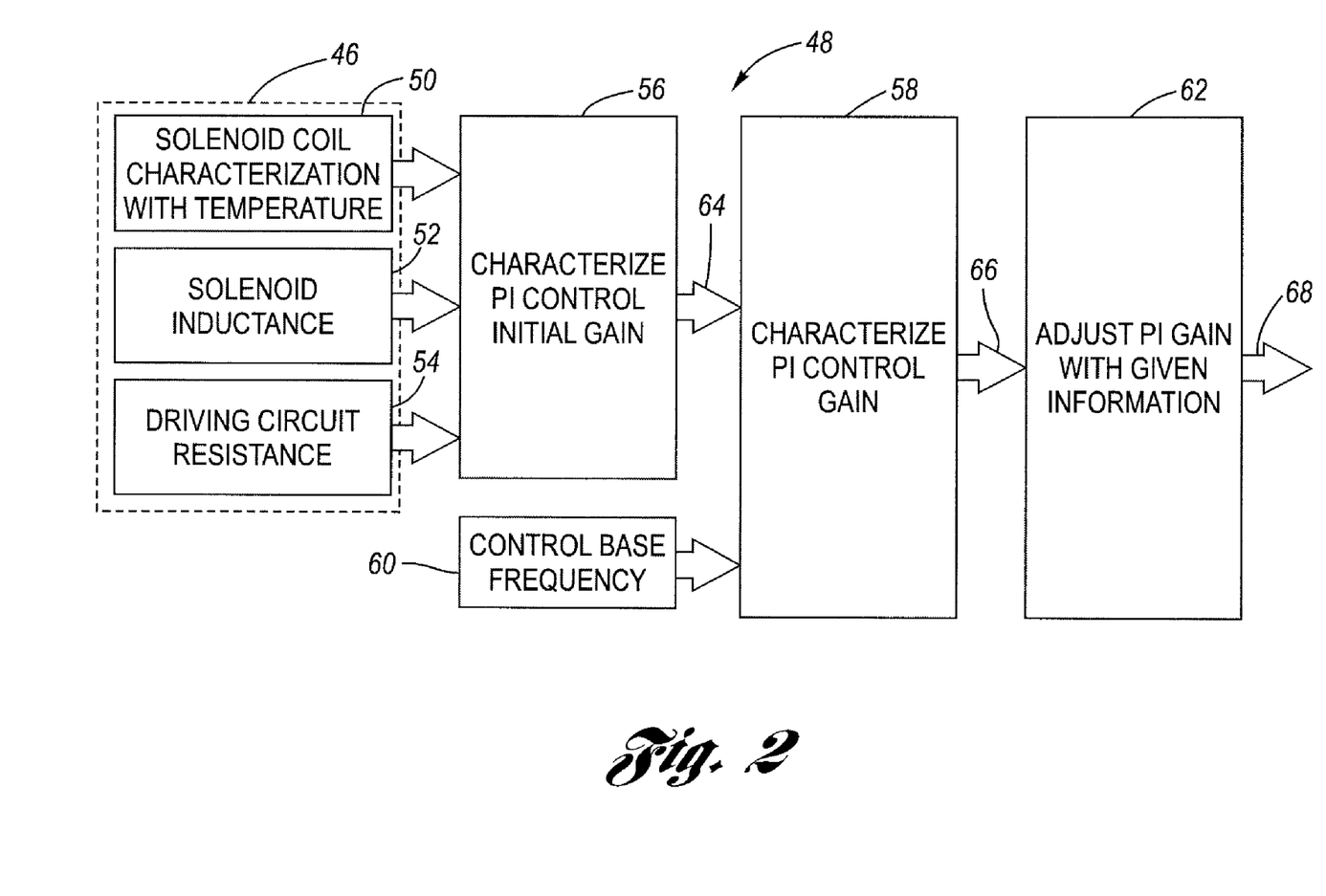
FIG. 2 is a block diagram showing a dynamic-gain calculating mechanism of the present invention.

FIG. 2 is a block diagram of a dynamic-gain calculation mechanism 48, which is preferably implemented in control arrangement 28. Dynamic-gain calculation mechanism 48 is coupled to the model 46 and retrieves various parameter values during operation. The model 46 may be implemented as one or more data structures and, as shown, may include a solenoid coil characterization block 50, a solenoid inductance block 52 and a driving circuit output resistance block 54. Blocks 50, 52 and 54 collectively define the major contributions to or influences on the electrical response of the drive circuit and solenoid. While model 46 is shown as "separate" from controller 28, it is preferably memory associated with controller 28, and may be either separate or integrated.

The control arrangement 28 may be implemented as a programmed electronic controller suitable for use with a number of different drive circuit solenoid hardware combinations. It should be appreciated that the electrical characteristics for a variety of different drive circuit/solenoid configurations, as would exist for different hardware platforms, can be accommodated by building one or more respective, different plant models 46. During run time, the gain-calculating mechanism 48, using the model 46 and based on the then-prevailing operating data (e.g., hydraulic fluid temperature, battery voltage), is operable to dynamically calculate gain constants necessary for the selected control strategy. In the illustrated embodiment, the selected control strategy is a proportional-integral (PI) control strategy, although it should be understood that other control strategies may be used.

Block 50 may include a data indicating the solenoid coil resistance as a function of temperature. The data in block 50 may be determined empirically on target hardware and may be stored in a data structure (such as a data table) in the memory of the control arrangement 28. Block 52 may include data indicating the inductance value of the coil of solenoid 16, which may also be determined empirically and stored in the memory of the control arrangement 28. Block 54 may include data indicating the output resistance of the drive circuit 30, and may correspond, for example, to a commonly used sense resistance (Rsense). The output resistance may also be stored in the memory of the control arrangement 28.

The gain-calculating mechanism 48 is configured to adjust the values of the values of the gain constants, which for the illustrated PI control include a proportional term $K_p$ and an integral term $K_i$. The gain-calculating mechanism 48 includes a number of processing blocks to achieve this function, including a block 56 configured to calculate initial values for the gain constants, a block 58 configured to calculate updated values for the gain constants, and a block 62 configured to make, if needed, limiting adjustments to the updated gain constants.

More specifically, the block 56 is configured to calculate the initial values for the gain constants using the data in the plant model 46 and in response to a potentially varying operating parameter (e.g., oil temperature). The initial gain constants ($K_p$, $K_i$) produced as outputs are collectively referred to as signals 64. The block 58 is configured to calculate the updated values for the gain constants based on a specific, selected value of a control base frequency. As understood in the art, a control strategy may include small perturbations having a relatively small amplitude at a control base frequency, which frequency value is what is provided by block 60. The updated gain constants ($K_p$, $K_i$) produced as outputs are collectively referred to as signals 66. The block 62 is configured to limit, if needed, the updated values for the gain constants to predetermined maximum values. These maximum values are set to place reasonable limits on the values for the gain constants. Accordingly, the function of block 62 operates to effectively improve the stability of the control system.

Figure 3:
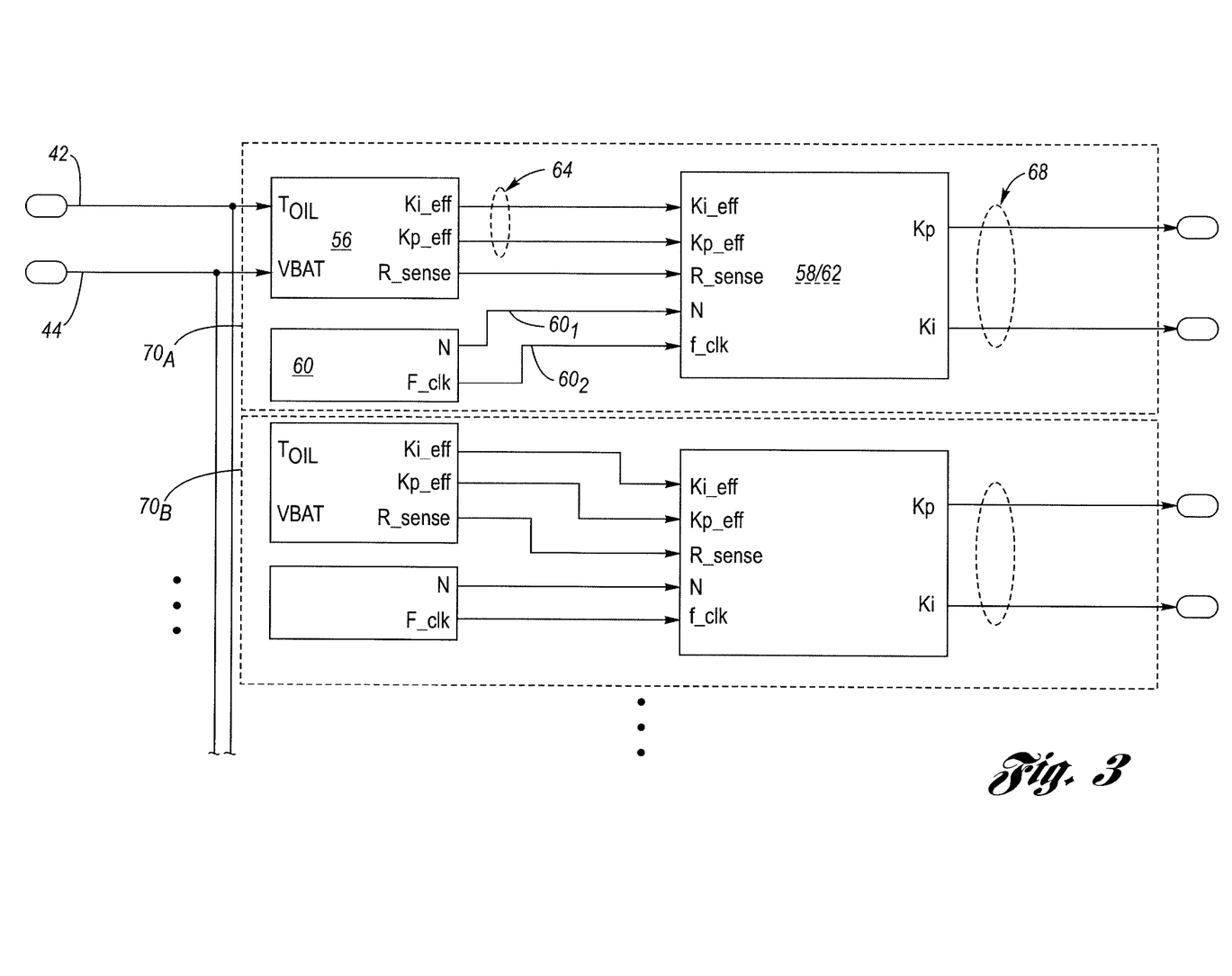
FIG. 3 is a diagram showing, in greater detail, the blocks for calculating the initial and updated gain constants, one for each of the multiple solenoid operated valves in a system.

FIG. 3 is a block diagram showing a typical deployment of the gain calculating mechanism 48. For a typical automatic speed change transmission, multiple solenoids operated values would be used and thus also would need to be controlled (e.g., only two controlled solenoids are shown in FIG. 1 for simplicity sake). As shown in FIG. 3, this results in a first block 70A (enclosed in dashed-line format) for a first solenoid, a second block 70B (also enclosed in dashed-line format) for a second solenoid, and so on (i.e., additional blocks 70C, 70D, etc., not shown, would be included for additional solenoid in the system). Each of the blocks 70A, 70B include a dynamic-gain calculating mechanism 48. The input signal 42 ($T_{OIL}$) and the signal 44 ($V_{BAT}$) are inputs provided to the initial gain calculating block 56. The blocks 56, 58, 60 in FIG. 3 correspond to blocks 56, 58 and 60 in FIG. 2, but with increased detail shown. Output signals 64 include the initial gain constants $K_i$_eff and $K_p$_eff and an output resistance $R_{sense}$, which describes the output resistance of the drive circuit 30. The initial gain constants 64 are dynamically adjusted by virtue of any dynamic changes in the input signals 42, 44 ($T_{OIL}$, $V_{BAT}$). The control base frequency block 60 develops outputs N and $f_{clk}$, which correspond to a counter and clock frequency signals, respectively, as understood by one of ordinary skill in the art for a digital implementation of a control strategy. Outputs N and $f_{clk}$ are designated 60$_1$ and 60$_2$, respectively. The block 58 as shown calculates the updated gain constants as a function of the initial gain constants, the control base frequency (from block 60) and the output resistance $R_{sense}$. Block 62 outputs the final gain constants, limited if needed, shown as signals 68.

Figure 4:
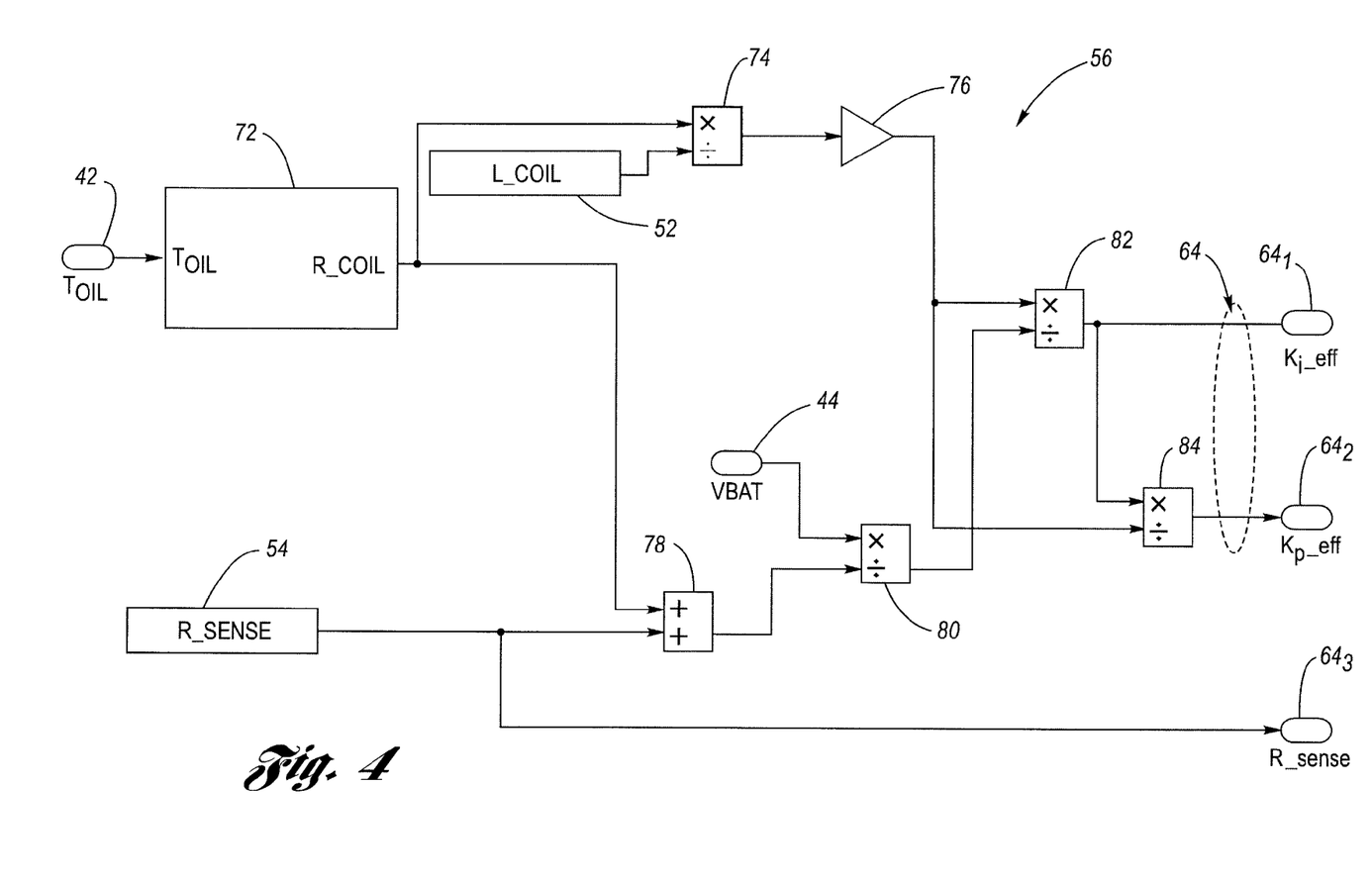
FIG. 4 is a schematic and block diagram showing, in greater detail, the initial gain constant calculating block of FIG. 3.

FIG. 4 shows, in greater detail, an exemplary PI control embodiment. The initial gain-constant calculating block 56 includes a coil resistance-versus-temperature data structure 72, a divide block 74, a gain block 76, an add block 78, and multiple divide blocks 80, 82 and 84. It should be understood that this representation is for description purposes only. The data structure 72 includes data that describes the value of the resistance of the coil of the solenoid 16 as a function of the coil temperature. The temperature of the hydraulic fluid ($T_{OIL}$) may be used as a proxy for the coil temperature. The output of the data table 72 is a value referred to as R_Coil. The coil resistance (R_Coil) from the block 72 and the coil inductance (L_Coil) from the block 52 are provided to the divide block 74. The output of the divide block 74, referred to as W_Coil_Raw, is shown in equation (1). This quantity is then provided to the gain block 76, which outputs a quantity referred to as W_Coil, represented in equation (2).

$$W\_Coil\_Raw = \frac{R\_Coil}{L\_Coil} \quad (1)$$

$$W\_Coil = Gain * W\_Coil\_Raw \quad (2)$$

The coil resistance (R_Coil) and the output resistance (R_sense) are provided to the add block 78, which outputs a quantity (R_total) indicative of the total resistance, which is represented in equation (3). The battery voltage ($V_{BAT}$) and the total resistance (R_total) are provided to the divide block 80, which outputs a quantity (Cmp) represented in equation (4):

$$R\_total = R\_Coil + R\_Sense \quad (3)$$

$$Cmp = \frac{V_{BAT}}{R\_total} \quad (4)$$

The output of the gain block 76 (W_Coil) and the output of the divide block 80 (Cmp) are provided to the divide block 82. The output of the divide block 82 pertains to the integral term gain constant, and is called the effective integral term gain constant ($K_i$_eff), which is represented in equation (5). The output of the gain block 76 (W_Coil) and the output of the divide block 82 ($K_i$_eff) are provided to the divide block 84. The output of the divide block 84 pertains to the proportional term gain constant, and is called the effective proportional term gain constant ($K_p$_eff), which is represented in equation (6). The initial gain constants $K_i$_eff and $K_p$_eff, which correspond to equations (5) and (6), are also designated numerically as 64$_1$ and 64$_2$ in the Figures. $R_{sense}$ is designated numerically as 64$_3$, in the Figures.

$$K_i\_eff = \frac{W\_Coil}{Cmp} \quad (5)$$

$$K_p\_eff = \frac{K_i\_eff}{W\_Coil} \quad (6)$$

Overall, the initial gain constant calculating block 56 is responsive to changes in environmental conditions (e.g., oil temperature, battery voltage), making use of a predefined model of the electrical plant dynamics, to calculate the initial values of the need P, I gain constants.

Figure 5:
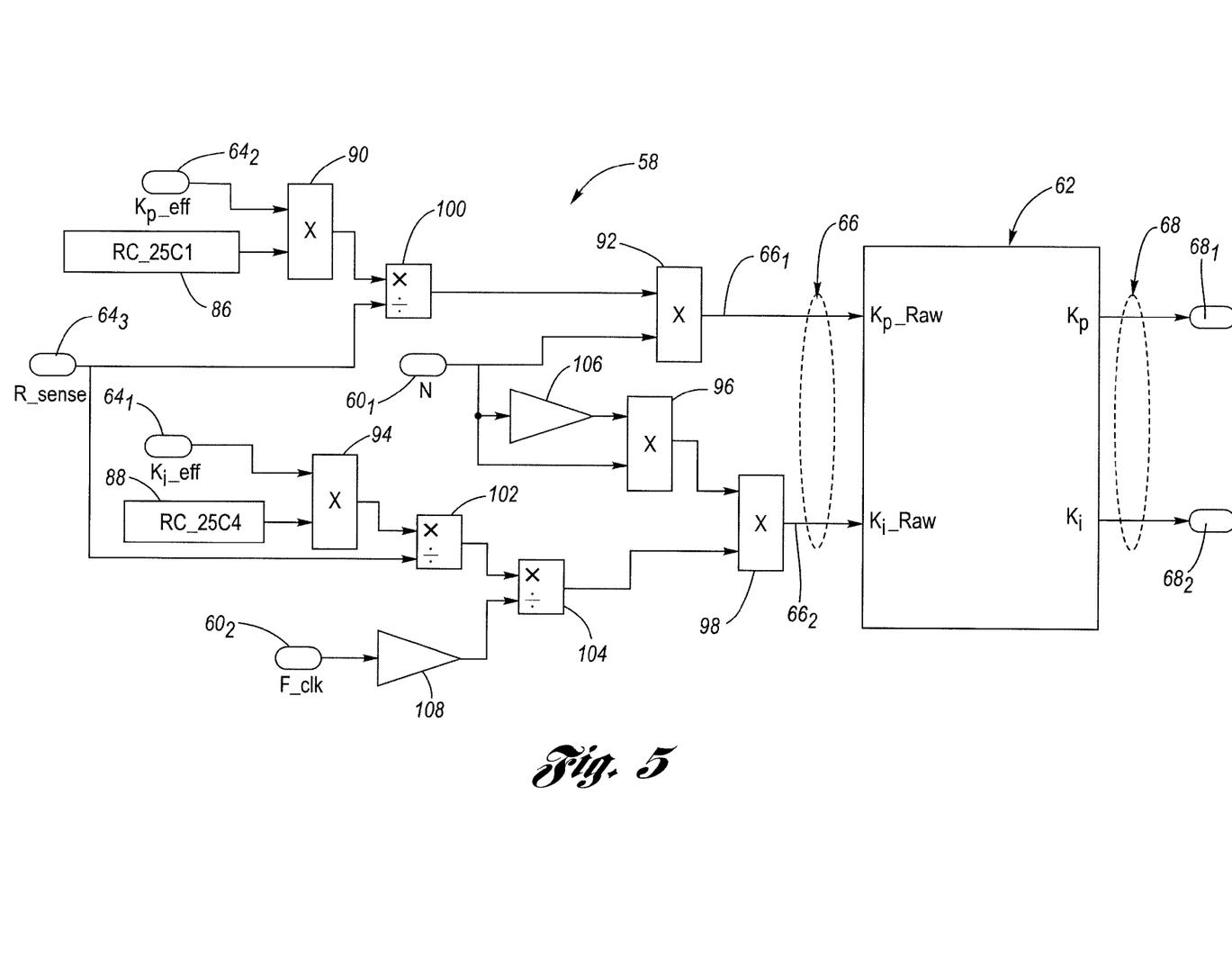
FIG. 5 is a schematic and block diagram showing, in greater detail, the updating gain constant calculating block of FIG. 3, and the gain constant limiting block of FIG. 2.

FIG. 5 is a schematic and block diagram showing, in greater detail, the updated gain-constant calculating block 58. The block 58 includes a predetermined data block 86 (Rc_25C1), a predetermined data block 88 (Rc_25C4), multiply blocks 90, 92, 94, 96 and 98, divide blocks 100, 102 and 104, and gain blocks 106 and 108. The updated gain constant $K_p$_Raw (proportional term of the PI control strategy) is designated 66$_1$ and the updated gain constant $K_i$_Raw (integral term of the PI control strategy) is designated 66$_2$.

The updated gain constant 66$_1$ ($K_p$_Raw) is formed as follows. The initial gain constant $K_p$_eff and the predetermined value in block 86 are provided to the multiply block 90. The output of the multiply block 90, Kp1, is represented in equation (7). The term Kp1 is provided to the divide block 100, along with the R_sense value $64_3$. The output of divide block 100, $K_p$_normalized, is represented by equation (8).

$$Kp1 = K_p\_\text{eff} * Rc(\text{at } 25C) \quad (7)$$

$$Kp\_\text{normalized} = \frac{Kp1}{R\_\text{sense}} \quad (8)$$

The output of the divide block 100, $K_p$_normalized, and the parameter "N" ($60_1$) are both provided to the multiply block 92, whose output is the updated gain constant $K_p$_Raw ($66_1$).

The updated gain constant $66_2$ ($K_i$_Raw) is formed as follows. The initial gain constant $K_i$_eff and the predetermined value from block 88 are sent to the multiply block 94. The output of the multiply block 94, which is a quantity represented in equation (9), is provided to the divide block 102 along with the $R^{sense\ value}\ 64_3$. The output of divide block 102 is represented by equation (10).

$$Ki1 = K_i\_\text{eff} * Rc \quad (9)$$

$$Ki\_\text{normalized} = \frac{Ki1}{R\_\text{sense}} \quad (10)$$

The f_clk signal $60_2$ is provided to the gain block 108, whose output is a quantity represented in equation (11).

$$StepSize = \frac{f\_clk}{step\_sizer} \quad (11)$$

The outputs of the divide block 102 and the gain block 108 are provided to the divide block 104, whose output is a quantity represented in equation (12).

$$Ki\_s = \frac{Ki\_\text{normalized}}{StepSize} \quad (12)$$

Additionally, the parameter "N" is provided to gain block 106, whose output is a quantity represented in equation (13). The output of gain block 106 and the parameter "N" are both provided to multiply block 96, whose output is a quantity represented in equation (14).

$$StepDivider = \frac{N}{Coefficient} \quad (13)$$

$$StepDivCoeff = N * \frac{N}{Coefficient} \quad (14)$$

The output of the multiply block 96 and the output of the divide block 104 are both provided to the multiply block 98, whose output is the updated gain constant $K_i$ Raw ($66_2$).

FIG. 5 also shows the gain-constant limiting block 62, which is configured to make adjustments, if needed, to the gain constants $K_p$_Raw and $K_i$_Raw, in order to limit them to reasonable, predetermined maximum values. Block 62 may be implemented using conventional approaches for limiting the outputs, which are provided as outputs $K_p$ and $K_i$.

In one embodiment, block 62 may be configured to establishing a state machine having a first state corresponding to a pass-through of the updated values and a second state corresponding to a limiting effect placed on the updated values to the maximum predetermined values.

Figure 6A:
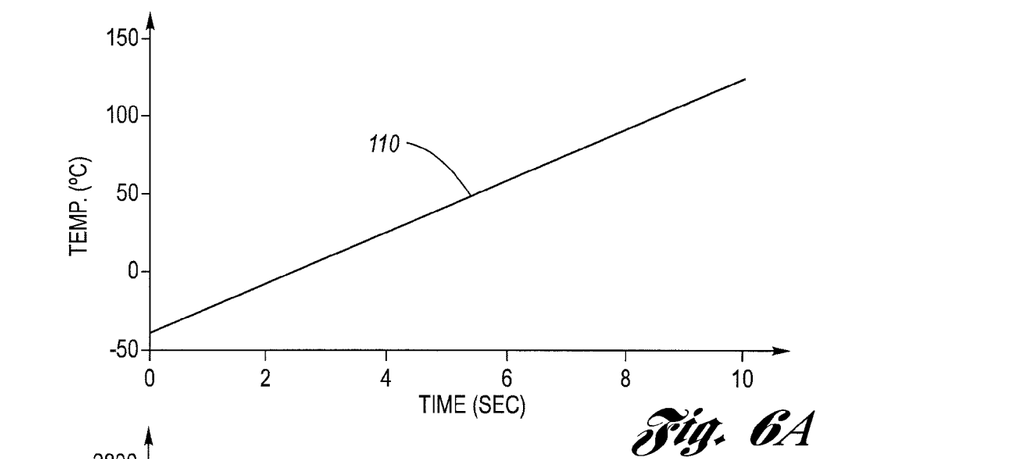
FIGS. 6A-6C are timing diagrams showing that as the temperature rises, embodiments of the invention will adjust the proportional and integral gain constants accordingly.
Figure 6B:
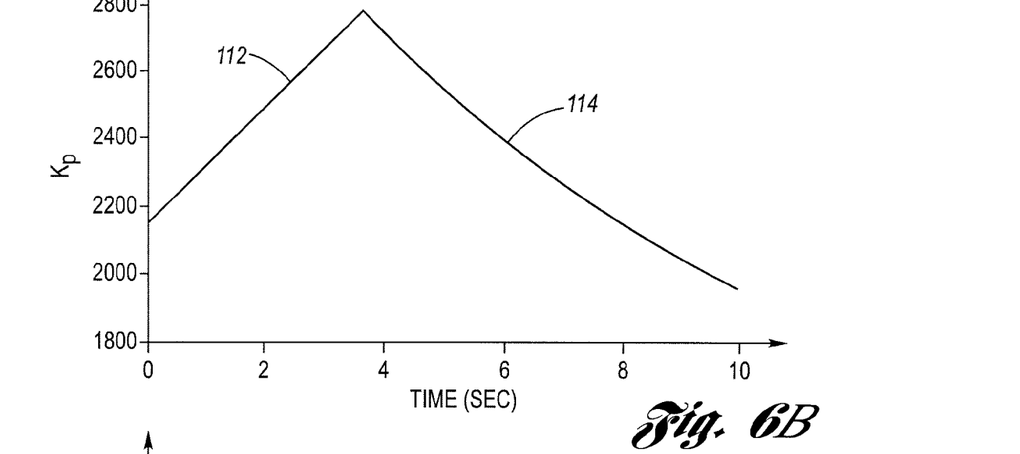
Figure 6C:
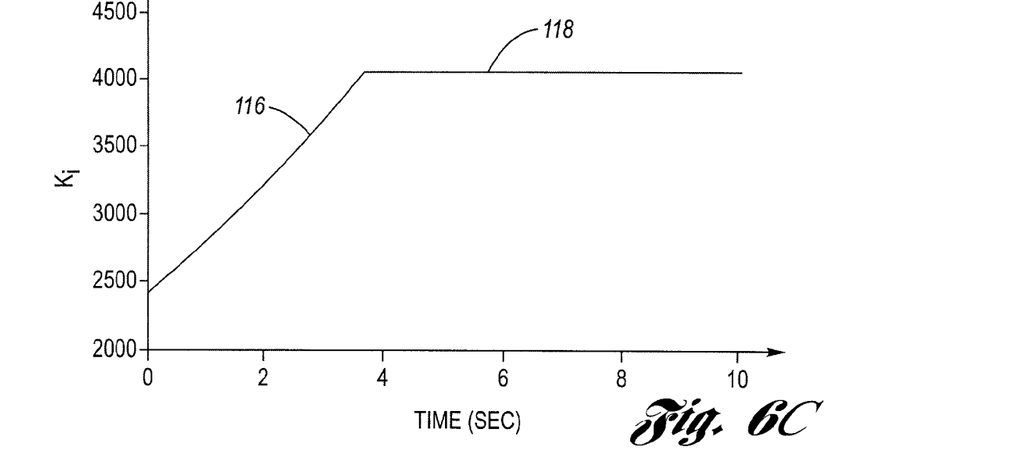

FIGS. 6A-6C are timing diagrams illustrating the operation of the present invention. All three FIGS. 6A-6C are coordinated on the same X-axis (time). FIG. 6A shows a trace 110 reflecting an increase in the oil temperature ($T_{OIL}$) 42 from about −40° C. to about 125° C. Accordingly, in this set of Figures, it is the temperature operating parameter that will be varied to illustrate the invention. FIG. 6B shows how the proportional gain constant $K_p$ dynamically increases (trace 112) in response to an increasing temperature over the time interval 0-~4 seconds. FIG. 6B further shows how $K_p$ dynamically decreases (trace 114) even in view of the ever-increasing oil temperature over the time interval ~4-10 seconds. FIG. 6C shows how the integral gain constant $K_i$ dynamically increases (trace 116) in response to an increasing temperature over the time interval 0-~4 seconds. FIG. 6C further shows the limiting effect of limiting block 62, particularly how the integral gain constant $K_i$ is limited to a fixed maximum value (trace 118), even in view of the ever-increasing oil temperature, over the time interval ~4-10 seconds.

The present invention provides a system and method for (1) dynamically calculating adjustments to various control gain-constants as environment influences, such as oil temperature and battery voltage vary; and (2) modeling the electrical plant characteristics, which gives the flexibility needed to easily adapt the control strategies to differing hardware configurations by simply producing a new model for the target hardware configuration.

Returning now to FIG. 1, further details concerning system 10 will be set forth to ensure that an exemplary environment suitable for the present invention is fully described and illustrated. It should be understood that portions of the following are exemplary only and not limiting in nature. Many other configurations are known to those of ordinary skill in the art and are consistent with the teachings of the present invention.

It should be understood that the pair of members 22, 24 in the illustrated embodiment each may be rotating, but this is exemplary only and not limiting in nature. For example, in alternate embodiments, one of the members 22, 24 may comprise a non-rotating (e.g., gear sets) member. The illustrated embodiment, however, shows the arrangement for a typical shift. On a clutch-to-clutch transmission, for example, a shift is completed by taking one clutch element on and one clutch element off to ring on the different members. The two control structures are shown in parallel because one would use two different circuits to complete the shift (e.g., there would be two solenoids so the algorithm of the present invention would be duplicated to perform the function on both, which are changing pressure at the same time).

Apparatus 10 may be suitably employed in an automatic speed change power transmission of the type described in the Background section. That is, a transmission of the type having hydraulic fluid-actuated (e.g., piston operated type actuation) clutches (e.g., band type clutch), such as clutch 20, configured such that when applied are operative to engage first and second members (e.g., planetary gears, or other rotating members in one embodiment, or one rotating and one non-rotating member in an alternate embodiment) together so that rotating torque may be transmitted from one member to the other or to maintain an otherwise rotatable member stationary, or many other arrangements, such as shown in FIG. 1 described above. As also described in the Background, controlling and varying the hydraulic fluid clutch pressure can materially affect the operating characteristic of the clutch and in turn the resulting engagement of gears.

Hydraulic fluid supply 12 includes an outlet that supplies hydraulic fluid through line 32 to electro-hydraulic module 14. Fluid supply 12 may comprise conventional components known to those of ordinary skill in the art, for example, pumps, pressure regulating devices, valves and the like. Fluid supply 12 provides hydraulic fluid at a nominal feed pressure ($P_{SUPPLY}$) in accordance with the design requirements of any particular constructed embodiment.

Electro-hydraulic pressure control module 14 has (i) an inlet configured to receive the supply of hydraulic fluid at the feed/supply pressure, which in FIG. 1 is designated $P_{SUPPLY}$, via line 32 as well as (ii) an outlet coupled to a line 34. The outlet is configured to provide hydraulic fluid at a certain fluid flow having an outlet pressure that is variable in accordance with a solenoid control current signal 36 produced by drive circuit 30 as a function of a solenoid current command signal 38. The module's outlet is in fluid communication with clutch 20 via line 34 and forms a hydraulic fluid circuit therewith. This hydraulic fluid circuit, as known, may include various lines, orifices, and the like and include the hydraulic actuator portion of clutch 20, which may have no fluid accumulator, or only a relatively small accumulator. The clutch pressure developed at clutch 20 is designated as clutch pressure ($P_C$).

Linear solenoid 16 may comprise conventional components known to those of ordinary skill in the art. In one embodiment, linear solenoid 16 may comprise a pressure control solenoid (for example, a variable bleed solenoid, or variable flow solenoid), which is a current controlled device that produces a fluid flow at an output pressure on an outlet line that is a function of supply pressure ($P_{SUPPLY}$) and an applied solenoid current signal (i.e., solenoid drive current 36). In an alternate embodiment, linear solenoid 16 may comprise a pulse-width modulated (PWM) actuator (not shown) that produces an output pressure as a function of supply pressure and corresponding to the duty cycle of an input drive signal. It should be understood that the present invention is not limited to these two embodiments, which are merely exemplary and not limiting in nature.

Pressure regulating valve 18 that is provided with (i) an inlet for receiving a supply of hydraulic fluid as well as (ii) an output configured for connection to clutch 20 via line 34. Valve 18 is configured to provide a fluid flow on line 34 at an output pressure to the clutch that is variable in accordance with a so-called pilot or "control" pressure on the line from linear solenoid 16. Pressure regulating valve 18 may be configured to provide flow at a greater level than available with linear solenoid 16, in accordance with the requirements of clutch 20. Valve 18 may comprise conventional components known in the art, for example, in one embodiment, valve 18 may comprise a pilot operated spool valve.

It should be understood that while FIG. 1 shows a two-stage module for pressure control that the present invention is not so limited, and may be extended to less than or more than the two-stage illustrated embodiment. In addition, for clarity and not by way of limitation, the vocabulary used herein necessarily involves terms specific to a two-stage embodiment, as per its correspondence to the physical two-stage module being described.

Clutch pressure command 26 may be generated by an application control program, which may be a higher level control and is configured, for example via programming of a transmission control unit (TCU) or the like, to implement various shifting patterns based on available operating information, such as engine rpm, vehicle speed and other driving conditions. To implement such shifting patterns, as known, the application control program must ultimately cause the engagement and/or disengagement of the various speed change gears, which is accomplished through applying/releasing corresponding clutches. As still further known, the application control program/layer generates the clutch pressure command signal 26, which is a command or signal that is indicative of a desired or commanded clutch pressure. Typically, the application control program generates a clutch pressure profile of the desired clutch pressure level as a function of time, which constitutes the clutch pressure command or signal 26, sometimes referred to herein as the command pressure.

Control arrangement 28 with the functionality described above for dynamically adjusting gain-constants for a selected control strategy, is configured to generate the solenoid current command 38, which is provided to drive circuit 30. In all other respects, control arrangement 28 may comprise conventional components and/or configuration/approaches for translating an input clutch pressure command signal 26 into a corresponding solenoid current command 38.

Additionally, it should be understood that control arrangement 28 may be implemented in an electronic controller, including conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A method of controlling a solenoid-operated fluid valve that has an output hydraulic pressure that varies in accordance with an input solenoid control current delivered from a drive circuit, comprising the steps of:

providing a model characterizing the plant dynamics of the solenoid-operated fluid valve and the drive circuit, the model being dependent on at least one operating parameter that may vary;

measuring the value of the operating parameter;

adjusting one or more gain constants for a selected control strategy, based on the measured operating parameter value, using the model; and determining a required solenoid control current based on the selected control strategy including the adjusted gain constants therefor; and applying the required solenoid control current to the solenoid-operated fluid valve.

2. The method of claim 1 wherein the at least one operating parameter comprises a hydraulic fluid temperature, and wherein the step of providing a model includes the sub-step of:

characterizing (i) an output resistance of the drive circuit, (ii) a coil inductance of the solenoid, and (iii) a coil resistance of the solenoid as a function of the hydraulic fluid temperature.

3. The method of claim 1 wherein the step of adjusting one or more gain constants includes the sub-steps of:

calculating initial values for the gain constants as a function of at least the measured operating parameter value;

defining a control base frequency; and determining updated values for the gain constants using the initial values and the control base frequency.

4. The method of claim 3 wherein said adjusting step further includes the sub-step of:

limiting the updated values for the gain constants to respective predetermined maximum values.

5. The method of claim 4 wherein said limiting step includes the sub-steps of:

establishing a state machine having a first state corresponding to a pass-through of the updated values and a second state corresponding to a limiting effect on the updated value.

6. The method of claim 1 wherein the selected control strategy comprises a proportional-integral (PI) control.

7. The method of claim 1 wherein the selected control strategy comprises a proportional-integral-derivative (PID) control.

* * * * *